(12) United States Patent
Wu et al.

(10) Patent No.: US 12,086,572 B1
(45) Date of Patent: Sep. 10, 2024

(54) SOFTWARE DEFINED NEURAL NETWORK LAYER PIPELINING

(71) Applicant: Xilinx, Inc., San Jose, CA (US)

(72) Inventors: Yongjun Wu, San Jose, CA (US);
Jindrich Zejda, Saratoga, CA (US);
Elliott Delaye, San Jose, CA (US);
Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1102 days.

(21) Appl. No.: 15/786,452

(22) Filed: Oct. 17, 2017

(51) Int. Cl.
| | |
|---|---|
| *G06F 8/30* | (2018.01) |
| *G06F 8/41* | (2018.01) |
| *G06F 12/06* | (2006.01) |
| *G06N 3/04* | (2023.01) |
| *G06N 20/00* | (2019.01) |

(52) U.S. Cl.
CPC ............... *G06F 8/313* (2013.01); *G06F 8/47* (2013.01); *G06F 12/0646* (2013.01); *G06N 3/04* (2013.01); *G06N 20/00* (2019.01)

(58) Field of Classification Search
CPC ................................. G06N 3/04; G06N 20/00
See application file for complete search history.

(56) References Cited

U.S. PATENT DOCUMENTS

| | | | |
|---|---|---|---|
| 6,346,825 B1 | 2/2002 | Pang et al. | |
| 10,614,354 B2 * | 4/2020 | Aydonat | G06N 3/045 |
| 2010/0076915 A1 * | 3/2010 | Xu | G06N 3/084 |
| | | | 706/25 |
| 2017/0103298 A1 * | 4/2017 | Ling | G06N 3/0454 |
| 2018/0101763 A1 * | 4/2018 | Barnard | G06F 12/0607 |

OTHER PUBLICATIONS

Martinez et al, "An efficient and expandable hardware implementation of multilayer cellular neural networks", 2013, Neurocomputing, vol. 114, pp. 54-62. (Year: 2013).*
Ma et al, "Scalable and Modularized RTL Compilation of Convolutional Neural Networks onto FPGA", 2016, 26th International Conference on Field Programmable Logic and Applications, pp. 1-8. (Year: 2016).*

(Continued)

*Primary Examiner* — Alexey Shmatov
*Assistant Examiner* — Clint Mullinax
(74) *Attorney, Agent, or Firm* — Patterson + Sheridan, LLP

(57) ABSTRACT

Embodiments herein describe techniques for expressing the layers of a neural network in a software model. In one embodiment, the software model includes a class that describes the various functional blocks (e.g., convolution units, max-pooling units, rectified linear units (ReLU), and scaling functions) used to execute the neural network layers. In turn, other classes in the software model can describe the operation of each of the functional blocks. In addition, the software model can include conditional logic for expressing how the data flows between the functional blocks since different layers in the neural network can process the data differently. A compiler can convert the high-level code in the software model (e.g., C++) into a hardware description language (e.g., register transfer level (RTL)) which is used to configure a hardware system to implement a neural network accelerator.

17 Claims, 12 Drawing Sheets

(56) References Cited

OTHER PUBLICATIONS

Wang et al, "DeepBurning: Automatic generation of FPGA-based learning accelerators for the Neural Network family", 2016, 53rd ACM/EDAC/IEEE Design Automation Conference, pp. 1-6. (Year: 2016).*

Akesson, Benny, "An introduction to SDRAM and memory controllers," downloaded Sep. 25, 2017 from http://www.es.ele.tue.nl/premadona/files/akesson01.pdf, pp. 1-30, Eindhoven University of Technology, Eindhoven, The Netherlands.

Chetlur, Sharan et al., "cuDNN: Efficient Primitives for Deep Learning," submitted Oct. 3, 2014, pp. 1-9, https://arxiv.org/pdf/1410.0759.pdf, Cornell University Library.

Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.

Gysel, Philipp, "Ristretto: Hardware-Oriented Approximation of Convolutional Neural Networks," May 20, 2016, pp. 1-73, https://arxiv.org/abs/1605.06402, Cornell University Library.

Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.

Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.

Mathworks, "im2col," dowloaded Sep. 22, 2017 from https://www.mathworks.com/help/images/ref/im2col.html?searchHighlight=im2col&s_tid=doc_srchtitle, pp. 1-3.

Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/ pp. 1-15.

Shaaban, Muhammed, "Systolic Architectures," Mar. 11, 2003, Kate Gleason College of Engineering, Rochester Institute of Technology, Rochester, New York, USA.

Stanford, "CS231n Convolutional Neural Networks for Visual Recognition," downloaded Sep. 25, 2017 from http://cs231n.stanford.edu/, pp. 1-23, Stanford University, Stanford, California, USA.

Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.

Wikipedia, "Convolutional neural network," Sep. 20, 2017, pp. 1-13, downloaded from https://en.wikipedia.org/wiki/Convolutional_neural_network.

Wikipedia, "Deep learning," Sep. 24, 2017, pp. 1-13, downloaded from https://en.wikipedia.org/wiki/Deep_learning.

Wikpedia, "Matrix Multiplication," Sep. 20, 2017, pp. 1-19, downloaded from https://en.wikipedia.org/wiki/Matrix_multiplication.

Wikipedia, "Multiprocessing," May 10, 2017, pp. 1-4, dowloaded from https://en.wikipedia.org/wiki/Multiprocessing.

Wikipedia, "Producer-consumer problem," Sep. 7, 2017, pp. 1-9, downloaded from https://en.wikipedia.org/wiki/Producer%E2%80%93consumer_problem.

Wikipedia, "Row- and colum-major order," Aug. 23, 2017, pp. 1-5, downloaded from https://en.wikipedia.org/wiki/Row-_and_column-major_order.

Wikipedia, "Systolic array," Mar. 22, 2017, pp. 1-5, downloaded from https://en.wikipedia.org/wiki/Systolic_array.

Wikipedia, "Very long instruction word," Jul. 13, 2017, pp. 1-3, downloaded from https://en.wikipedia.org/wiki/Very_long_instruction_word.

Xilinx, "Smarter Data Center," downloaded Sep. 22, 2017 from https://www.xilinx.com/applications/data-center.html, pp. 1-4, Xilinx, Inc., San Jose, California, USA.

Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.

Xilinx, "UltraScale Architecture DSP Slice User Guide," UG579 (v1.3), Nov. 24, 2015, pp. 1-74, Xilinx, Inc., San Jose, California, USA.

Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.

Xilinx, "Deep Learning with INT8 Optimization on Xilinx Devices," WP486 (v1.0.1), Apr. 24, 2017, pp. 1-11, Xilinx, Inc., San Jose, California, USA.

Xilinx, "Implementing Memory Structures for Video Processing in the Vivado HLS Tool," XAPP793 (v1.0), Sep. 20, 2012, pp. 1-8, Xilinx, Inc., San Jose, California, USA.

Xilinx, "Two-Dimensional Linear Filtering," XAPP933 (v1.1), Oct. 23, 2007, pp. 1-8, Xilinx, Inc., San Jose, California, USA.

* cited by examiner

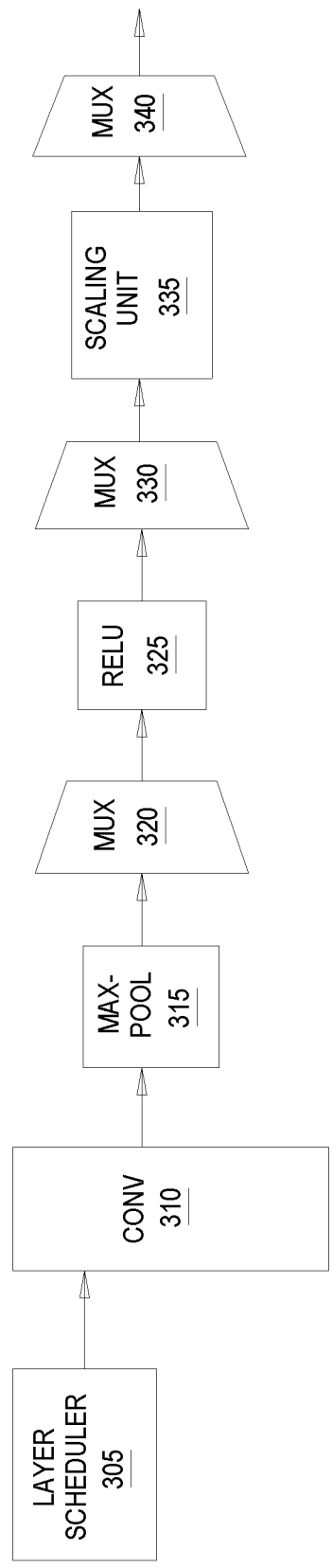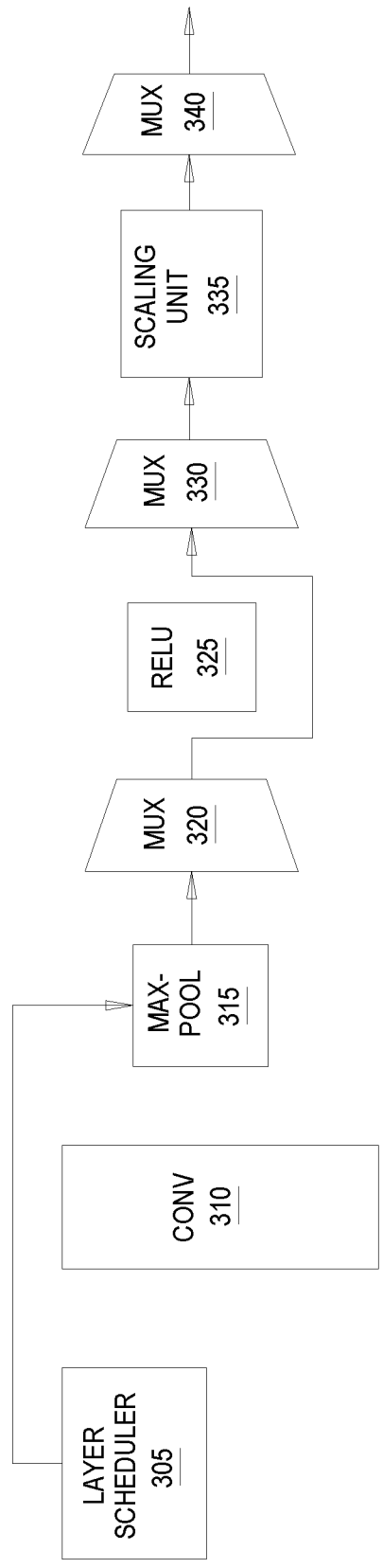

SOFTWARE DEFINED NEURAL NETWORK LAYER PIPELINING

TECHNICAL FIELD

Examples of the present disclosure generally relate to configuring a massively parallel programmable hardware system.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Using convolutional neural networks for machine learning has gained popularity in recent years. Field programmable gate array (FPGA) based implementations can be used to accelerate applications executing a neural network. Existing FPGA-based approaches implement fixed hardware logic for a specific neural network model, so each time the model changes, the programmable logic in the FPGA must be updated, re-compiled, and re-implemented. This is both time-consuming and error prone.

Today's neural network models are evolving at a rapid pace to increase accuracy, speed, or to solve domain specific problems. Having to update the FPGA each time the neural network model changes slow down the evolution of the neural network model since many neural network developers lack the requisite knowledge for programming the FPGA.

SUMMARY

Techniques for generating a neural network accelerator are described. One example is a method that includes receiving a neural network model comprising software code defining an architecture design where the architecture design represents a plurality of functional blocks interconnected using conditional logic for executing a plurality of layers in a neural network. The method includes receiving a value of a template parameter, wherein the template parameter controls an execution of at least one of the plurality of functional blocks and compiling, using one or more computing processors, the software code in the neural network model into a hardware design that implements the neural network accelerator in a hardware system.

Another example is a non-transitory computer-readable storage medium storing instructions, which when executed on one or more processing devices, perform an operation for generating a neural network accelerator. The operation includes receiving a neural network model comprising software code defining an architecture design where the architecture design represents a plurality of functional blocks interconnected using conditional logic for executing a plurality of layers in a neural network. The operation also includes receiving a value of a template parameter, wherein the template parameter controls an execution of at least one of the plurality of functional blocks and compiling, using one or more computing processors, the software code in the neural network model into a hardware design that implements the neural network accelerator in a hardware system.

Another example is a computing system that includes a processor and memory. The memory includes a compiler which, when executed by the processor performs an operation. The operation includes receiving a neural network model comprising software code defining an architecture design where the architecture design represents a plurality of functional blocks interconnected using conditional logic for executing a plurality of layers in a neural network. The operation also includes receiving a value of a template parameter, wherein the template parameter controls an execution of at least one of the plurality of functional blocks and compiling, using one or more computing processors, the software code in the neural network model into a hardware design that implements a neural network accelerator in a hardware system.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 4A and 4B illustrate data flows for two layers of the neural network in the architecture design, according to examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
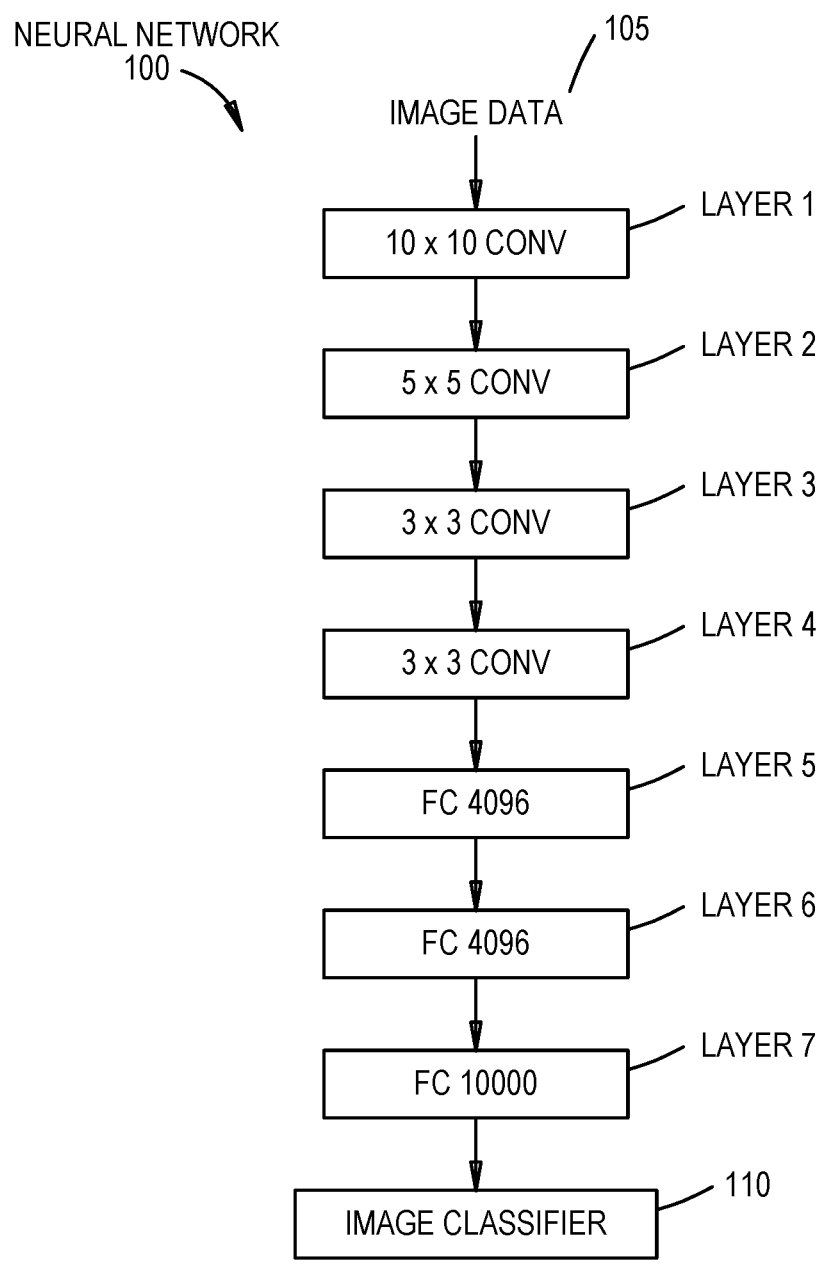
FIG. 1 illustrates a multi-layer neural network, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for expressing the layers of a neural network in a software model. In one embodiment, the software model includes a class that describes the various functional blocks (e.g., convolution units, max-pooling units, rectified linear units (ReLU), and scaling functions) used to execute the neural network layers. In turn, other classes in the software model can describe the operation of each of the functional blocks. In addition, the software model can include conditional logic for expressing how data flows between the functional blocks since different layers in the neural network can process the data differently.

A compiler converts the high-level code in the software model (e.g., C++) into a hardware description language (e.g., register transfer level (RTL)) which is used to configure a hardware system to implement a neural network accelerator (which may be referred to generally as an acceleration circuit). One advantage of expressing the functions of the neural network accelerator in a software model is that the neural network developer may be more proficient in the high-level code in the software model than in RTL. The developer can change the hardware configuration of the neural network accelerator by the changing the code in the software model which the compiler then converts into RTL.

FIG. 1 illustrates a multi-layer neural network 100, according to an example. As used herein, a neural network 100 is a computational module used in machine learning and is based on a large collection of connected units called artificial neurons where connections between the neurons carry an activation signal of varying strength. The neural network 100 can be trained from examples rather than being explicitly programmed. In one embodiment, the neurons in the neural network 100 are connected in layers—e.g., Layers 1, 2, 3, etc.—where data travels from the first layer—e.g., Layer 1—to the last layer—e.g., Layer 7. Although seven layers are shown in FIG. 1, the neural network 100 can include hundreds or thousands of different layers.

Neural networks can perform any number of tasks such as computer vision, feature detection, speech recognition, and the like. In FIG. 1, the neural network 100 detects features in a digital image such as classifying the objects in the image, performing facial recognition, identifying text, etc. To do so, image data 105 is fed into the first layer in the neural network which performs a corresponding function, in this example, a 10×10 convolution on the image data 105. The results of that function is then passed to the next layer—e.g., Layer 2—which performs its function before passing the processed image data to the next level, and so forth. After being processed by the layers, the data is received at an image classifier 110 which can detect features in the image data.

The layers are defined in a sequential order such that Layer 1 is performed before Layer 2, Layer 2 is performed before Layer 3, and so forth. Thus, there exists a data dependency between the lower layers and the upper layer(s). Although Layer 2 waits to receive data from Layer 1, in one embodiment, the neural network 100 can be parallelized such that each layer can operate concurrently. That is, during each clock cycle, the layers can receive new data and output processed data. For example, during each clock cycle, new image data 105 can be provided to Layer 1. For simplicity, assume that during each clock cycle a part of new image is provided to Layer 1 and each layer can output processed data for image data that was received in the previous clock cycle. If the layers are implemented in hardware to form a parallelized pipeline, after seven clock cycles, each of the layers operates concurrently to process the part of image data. The "part of image data" can be an entire image, a set of pixels of one image, a batch of images, or any amount of data that each layer can process concurrently. Thus, implementing the layers in hardware to form a parallel pipeline can vastly increase the throughput of the neural network when compared to operating the layers one at a time. The timing benefits of scheduling the layers in a massively parallel hardware system improve further as the number of layers in the neural network 100 increases.

Figure 2:
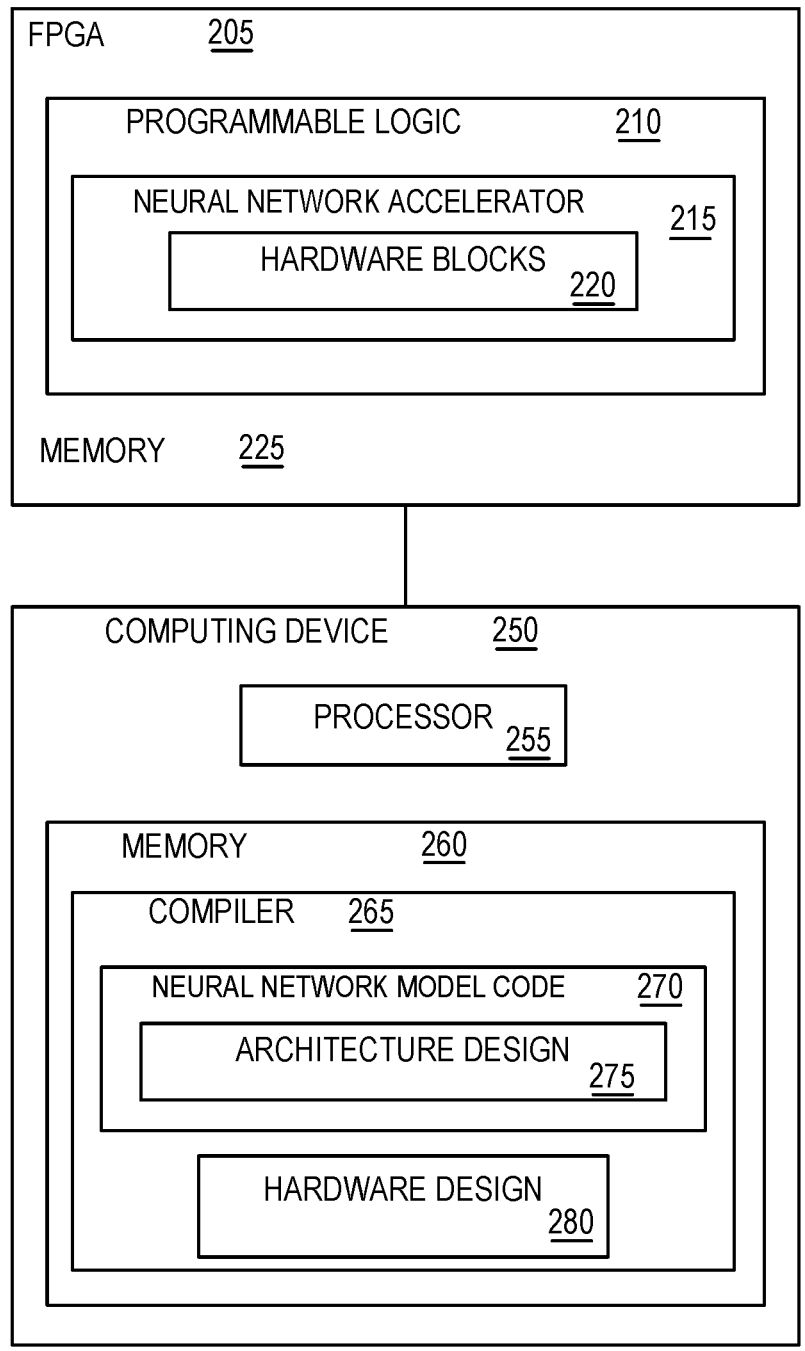
FIG. 2 is a system for establishing a neural network accelerator in an FPGA, according to an example.

FIG. 2 is a computing system for executing a neural network using a neural network accelerator 215 in an FPGA 205, according to an example. In addition to the FPGA 205, the system 200 includes a computing device 250 (also referred to as a host) which configures programmable logic 210 in the FPGA 205. The computing device 250 can be a laptop, desktop, or server. The computing device 250 includes a processor 255 which represents any number of processing elements which each can contain any number of processing cores. The device 250 also includes a memory 260 which can have volatile or non-volatile memory elements.

The memory 260 includes a compiler 265 which, in one embodiment, is a software application (e.g., an HLS compiler) that converts source code such as C or C++ into RTL code which configures the programmable logic 210 to establish the neural network accelerator 215. In this embodiment, the compiler 265 compiles neural network model code 270 which is high-level code that defines an architecture design 275 of the neural network. For example, the architecture design 275 may include functional blocks of the neural network such as convolution, im2col, max pooling, ReLU, and scaling functions which are connected using data streams or channels. In one embodiment, the architecture design 275 represents a general data flow for all the layers in the neural network. However, some of the functional blocks may not be used by all the layers, or may be used differently. In one embodiment, the architecture design 275 provides conditional logic for defining how the functional blocks in the design 275 are used by the different layers in the neural network.

The architecture design 275 can be expressed in a high-level coding language such as C++, C, or other similar type of software language. Using the neural network model code 270, the compiler 265 generates a hardware design 280 which configures programmable logic 210 in the FPGA 205 to implement the neural network accelerator 215. One advantage of defining the functions of the neural network in the neural network model code 270 is that a neural network developer (who is likely more proficient in software code than a hardware description language such as RTL) can configure the neural network accelerator 215 using high-level code which provides a general model for the layers in the neural network (i.e., the architecture design 275).

The FPGA 205 includes the programmable logic 210 and memory 225. The programmable logic 210 can include an array of programmable logic blocks and a hierarchy of reconfigurable interconnects that communicatively couple the logic blocks. In one embodiment, the neural network accelerator 215 includes hardware blocks 220 for performing the functions defined in the architecture design 275. Moreover, the programmable logic 210 can include conditional bypass data flows for changing the manner in which data flows between the hardware blocks 220 when executing the different layers in the neural network.

In one embodiment, the neural network model code 270 defines a sequential order of the functions in the neural network which can operate concurrently such as convolution, max pooling, activation units (e.g., rectified linear units (ReLU)), and scaling functions. Although not shown, the compiler 265 can have a scheduler to generate RTL in the hardware design 280 which statically schedules the neural network accelerator 215 such that the different hardware blocks 220 forming the accelerator 215 can operate concurrently in a pipeline. Exemplary techniques for scheduling the functional blocks defined by the architecture design 275 into a pipeline for implementing the neural network accelerator 215 are described in detail in the U.S. Patent Application titled "STATIC BLOCK SCHEDULING IN MASSIVELY PARALLEL SOFTWARE DEFINED HARDWARE SYSTEMS" with inventors Yongjun Wu, Jindrich Zejda, Elliott Delaye, and Ashish Sirasao which is herein incorporated by reference.

Although an FPGA 205 is shown, the techniques described herein can be performed to implement the neural network accelerator on other types of non-programmable hardware systems such as a graphics processor unit (GPU) or an application specific integrated circuit (ASIC) specially designed to implement a neural network. Further, the techniques described herein for generating the hardware design 280 can be used for other types of accelerators besides a neural network accelerator. For example, instead of expressing an architecture design of the layers in the neural network, the model code 270 can describe the high-level functions of a graphics accelerator or cryptographic accelerator.

Figure 3:
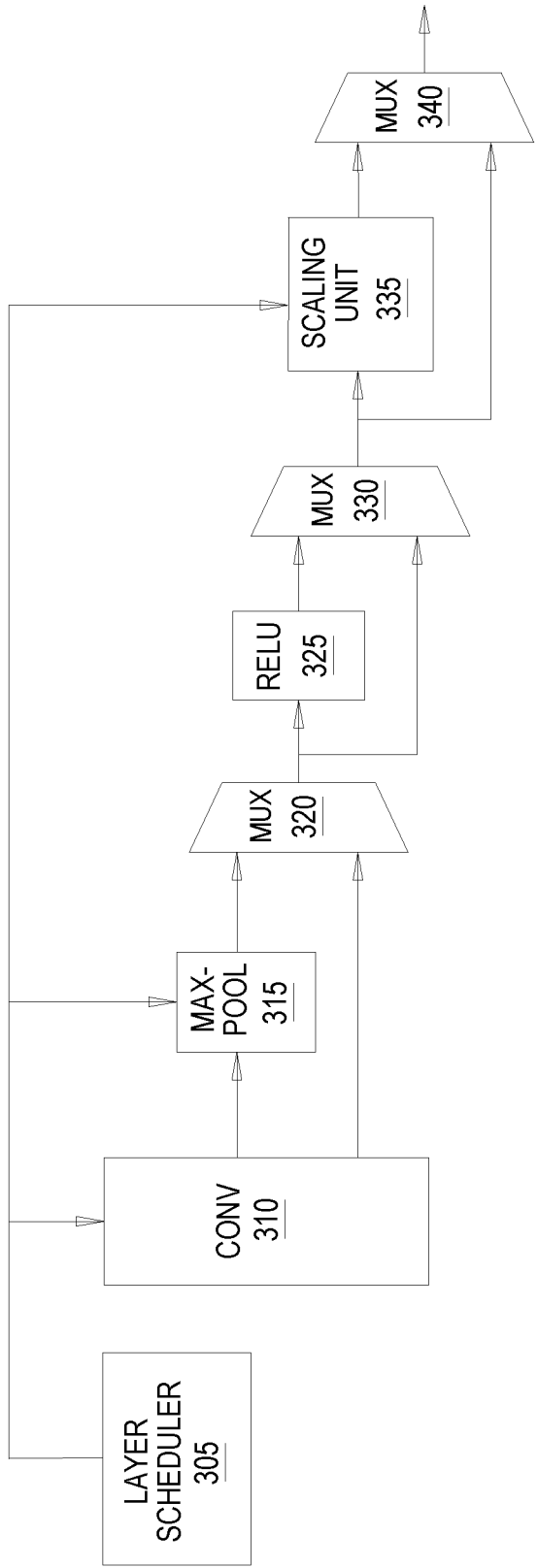
FIG. 3 is an architecture design for a neural network model, according to an example.

FIG. 3 is an architecture design 275 for a neural network model, according to an example. In one embodiment, the blocks and data flows illustrated in FIG. 3 represent graphically the neural network model code 270. In one embodiment, the architecture design 275 is a software or a hardware model that represents the complete neural network (and its layers) as implemented in the massively parallel hardware system—e.g., an FPGA.

In one embodiment, the architecture design 275 is generated by the neural network developer. For example, the developer may generate the architecture design 275 according to the type of neural network the user desires to implement on the FPGA. For example, different neural networks can have different layers and functions within those layers. As mentioned above, neural networks can be designed to perform different tasks such as feature detection in digital images, audio processing, or processing text. Non-limiting examples of neural networks include CNN, RNN, long short-term memory (LSTM) neural networks, and neural networks that use feature base learning or supervised/unsupervised learning. Moreover, the structure of the same types of neural networks can vary widely which means the architecture designs 275 of the neural networks also vary. For example, some CNNs can include tens of layers while others can include hundreds of layers where each of the layers can be configured differently—e.g., a layer that performs 3×3 convolution, a layer that performs 11×11 convolution, a fully connected (FC) layer, a pooling layer, etc.

In this example of a neural network, the architecture design 275 includes a layer scheduler 305, a convolution unit 310, a max-pooling unit 315, a multiplexer (mux) 320, a ReLU 325, a mux 330, a scaling unit 335, and a mux 340 for performing feature detection in an image. In one embodiment, the convolution unit 310 includes a matrix multiplier that performs matrix multiplication and weights received image data using any number of weights (or kernels). In one embodiment, the max-pooling unit 315 amplifies features in the image so the features are not lost when the image is scaled later in the pipeline. The ReLU 325 is a type of activation unit or ramp function which, in one embodiment, is defined as $f(x)=\max(0,x)$ where x is the output from a neuron. The scaling unit 335 can adjust the values of the processed data to minimize numerical errors due to quantization.

The layer scheduler 305 determines where the data flow starts. For example, for some layers, the input image data may first be sent to the convolution unit 310. In other layers in the neural network, the image data bypasses the convolution unit 310 and instead is sent by the layer scheduler 305 to the max-pooling unit 315 or the scaling unit 335. Furthermore, the manner in which the data propagates through the architecture design 275 can vary depending on the layer. For example, for a first layer, after the image data is processed by the convolution unit 310, the mux 320 may forward the processed data directly to the ReLU 325 thereby bypassing the max-pooling unit 315. Alternatively, in a second layer, the data outputted by the convolution unit 310 is first processed by the max-pooling unit 315 before the mux 320 transmits the data to the ReLU 325. In this manner, the multiplexers 320, 330, and 340 (also referred to as conditional logic or bypass flows) can alter how the image data flows through the architecture design 275 according to selection signals provided by, e.g., the layer scheduler 305.

In one embodiment, the architecture design 275 is a block diagram illustrating the complete system needed to execute a neural network. Put differently, the architecture design 275 represents, at an abstracted level, the hardware blocks needed in an FPGA (or other hardware system) to execute the neural network and its corresponding layers. Although not shown, the architecture design 275 may include dataflow channels inserted between different blocks to allow the blocks to execute concurrently. The dataflow channels can be properly sized to minimize the overall system latency. Moreover, the architecture design 275 illustrated in FIG. 3 can be software defined meaning the user simply expresses a sequence of scalar operations (represented here as the different blocks) and adds parallelization pragmas. By compiling the high-level code representing the architecture design 275 illustrated in FIG. 3 and using the parallelization pragma, the compiler can create a hardware design for configuring a neural network accelerator. As a result, the FPGA-implemented accelerator is always consistent with the software model defined by the architecture design 275. In one embodiment, the compiler can schedule the different hardware elements in the hardware design such that the different blocks shown in FIG. 3 execute concurrently (i.e., in parallel).

As mentioned above, the architecture design 275 can be represented as a software model (i.e., the neural network model code 270 in FIG. 2). In one embodiment, the software model of the design 275 can include one or more software classes (e.g., a C++ class). For neural network models, the class may define the number of layers in the neural network, active functional blocks in each layer (i.e., which of the functional blocks shown in FIG. 3 each layer uses), and the configuration of the layers. To change the configuration of the neural network, the developer can simply change the information contained in one of the classes, which the compiler then uses to update the hardware design implemented on the FPGA.

In one embodiment, the software model includes untimed functional code for a neural network with multiple layers. Further, the code is ordered in a defined sequence but is not explicitly scheduled and may include a parallelization pragma for the dataflow. This pragma permits the neural network developer to use a RTL concept by instantiating parallel blocks without having to schedule the blocks. After being compiled into RTL, the different functions in the code (e.g., Conv, MaxPool, ReLU, and Scale) operate concurrently. Although not shown, the code may include FIFOs (or other buffers) which interconnect the different functions.

FIGS. 4A and 4B illustrate data flows for two layers of the neural network in the architecture design, according to examples. Specifically, FIG. 4A illustrates the data flow through the architecture design 275 for Layer X while FIG. 4B illustrates the data flow through the architecture design 275 for Layer Y. Comparing these two figures illustrates how data can flow differently through the architecture design 275 illustrated in FIG. 3 when executing the different layers in the neural network.

In FIG. 4A, the layer scheduler 305 transmits image data to the convolution unit 310 which perform one or more convolutions on the data. The resulting data is then forwarded to the max-pooling unit 315. The mux 320 receives the data from the max-pooling unit 315, and in response to selection signals received from the layer scheduler 305 (not shown) can either forward the data to the ReLU 325 or bypass it—i.e., send the data directly to the mux 330. In one embodiment, the selection signals for controlling the muxes 320, 330, and 340 can be controlled by run-time parameters for the layers that are defined in the neural network software model (e.g., the neural network model code 270). For Layer X, the mux 320 transmits the data to the ReLU 325 which processes the data further before sending the data to the mux 330. Like with mux 320, using selection signals, the layer scheduler 305 can instruct the mux 330 to either transmit the received data to the scaling unit 335 or to bypass the scaling unit 335 and send the data to the mux 340. In this example, the mux 330 forwards the data to the scaling unit 335 which then outputs the data to the mux 340.

In FIG. 4B, when executing Layer Y, the layer scheduler 305 bypasses the convolution unit 310 and sends the image data to the max-pooling unit 315 where it is processed and forwarded to the mux 320. Selection signals instruct the mux 320 to bypass the ReLU 325. That is, in contrast to Layer X shown in FIG. 4A, in FIG. 4B the mux 320 bypasses the ReLU 325 such that the data is sent directly to the mux 330 which forwards the data to the scaling unit 335. Thus, not all the layers in the neural network need to use all the functional blocks in the high-level architecture design 275 of the neural network. Furthermore, the functional blocks may perform different tasks for the different layers. For example, one layer may perform a 3×3 convolution using the convolution unit 310 while another layer performs a 10×10 convolution using the convolution unit 310. As such, the functional blocks may include the necessary hardware elements for performing the different functions of the layers as specified by the software model.

Figure 5:
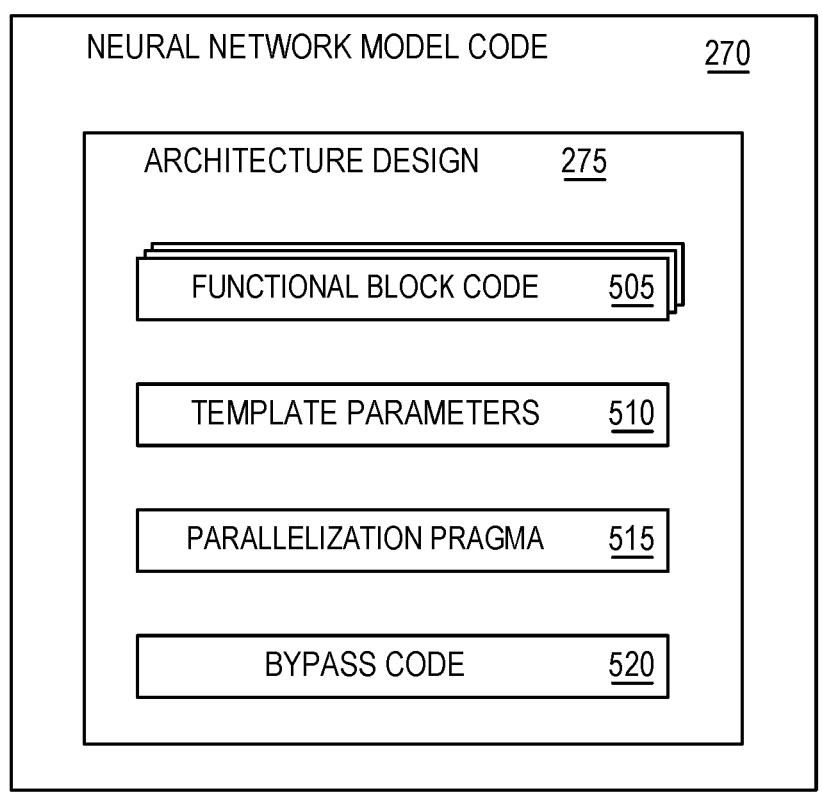
FIG. 5 is a block diagram of elements in neural network model code, according to an example.

FIG. 5 is a block diagram of elements in the neural network model code 270, according to an example. As shown, the architecture design 275 can be defined by various code elements such as functional block code 505, template parameters 510, a parallelization pragma 515, and bypass code 520. The functional block code 505 may be separate classes that define the operation of the different functional blocks in the architecture design 275. For example, the functional block code 505 may include a first class defining the convolution unit, a second class defining the max-pooling unit, a third class defining the ReLU, and a fourth class defining the scaling unit. In one embodiment, the classes in the functional block code 505 are not hardware specific and can be compiled by a CPU-targeting compiler.

The template parameters 510 allow fine control over the hardware elements configured after compiling the functional block code 505. In one embodiment, one set of template parameters 510 results in a single version of a compiled hardware module. Stated differently, changing the template parameters 510 changes the resulting hardware module generated by the functional block code 505. The template parameters 510 may be arguments for the classes defined by the functional block code 505. For example, the template parameters 510 may define a stride for an im2col function or scaling values used when performing the functional blocks shown in FIG. 3. In one embodiment, the template parameters 510 may be different for the different layers in the neural network. For example, different layers may use different im2col strides. As such, when compiling the functional block code 505, the compiler can generate a hardware design that can perform all the different im2col strides needed by the layers. Moreover, if the template parameters 510 change, the affected functional block code 505 can be recompiled to generate an updated hardware design. One advantage of using the template parameters 510 is that the neural network developer can change the high-level source code in the functional block code 505 to change the template parameters 510 which the compiler then uses to update the low level hardware code (e.g., RTL) in the hardware design.

The parallelization pragma 515 can be used to achieve concurrency where the functional blocks in the architecture design operate in parallel when processing received images. Using the parallelization pragma 515, the user can define the sequence at which the blocks are executed without scheduling these blocks (i.e., without defining when the blocks should be executed). In one embodiment, the parallelization pragma is a directive pragma which specifies to the compiler that the defined blocks should be scheduled to operate in parallel. In one embodiment, the parallelization pragma 515 defines the dataflow in the neural network. This pragma 515 permits the neural network developer to use a RTL concept by instantiating parallel blocks without having to schedule the blocks. After compiled into RTL, the different functions in the architecture design (e.g., Conv, Max-Pool, ReLU, and Scale) operate concurrently.

The bypass code 520 can include conditional logic that accommodates various neural networks (as well as different layers in the same neural network). The bypass code 520 may be implemented as a conditional C++ function with flow-dependent data bypass since the neural network blocks may change the volume of data. As shown in FIGS. 4A and 4B, the layers in the neural network (as well as different neural networks) can process the data differently using the functional blocks in the architecture design. For example, the im2col function of the convolution unit 310 in FIG. 3 may increase the amount of data while the max-pooling unit 315 reduces the amount of data. The bypass code 520 can define run-time parameters that accommodate these differences such that the same software model—i.e., the neural network model code 270—can be used to generate a hardware design that can execute different layers in the same neural network or multiple neural networks. For example, the hardware design (e.g., the programmable logic implementing a neural network accelerator in an FPGA) can execute two different types of convolution neural networks without having to recompile the neural network model code 270.

Figure 6:
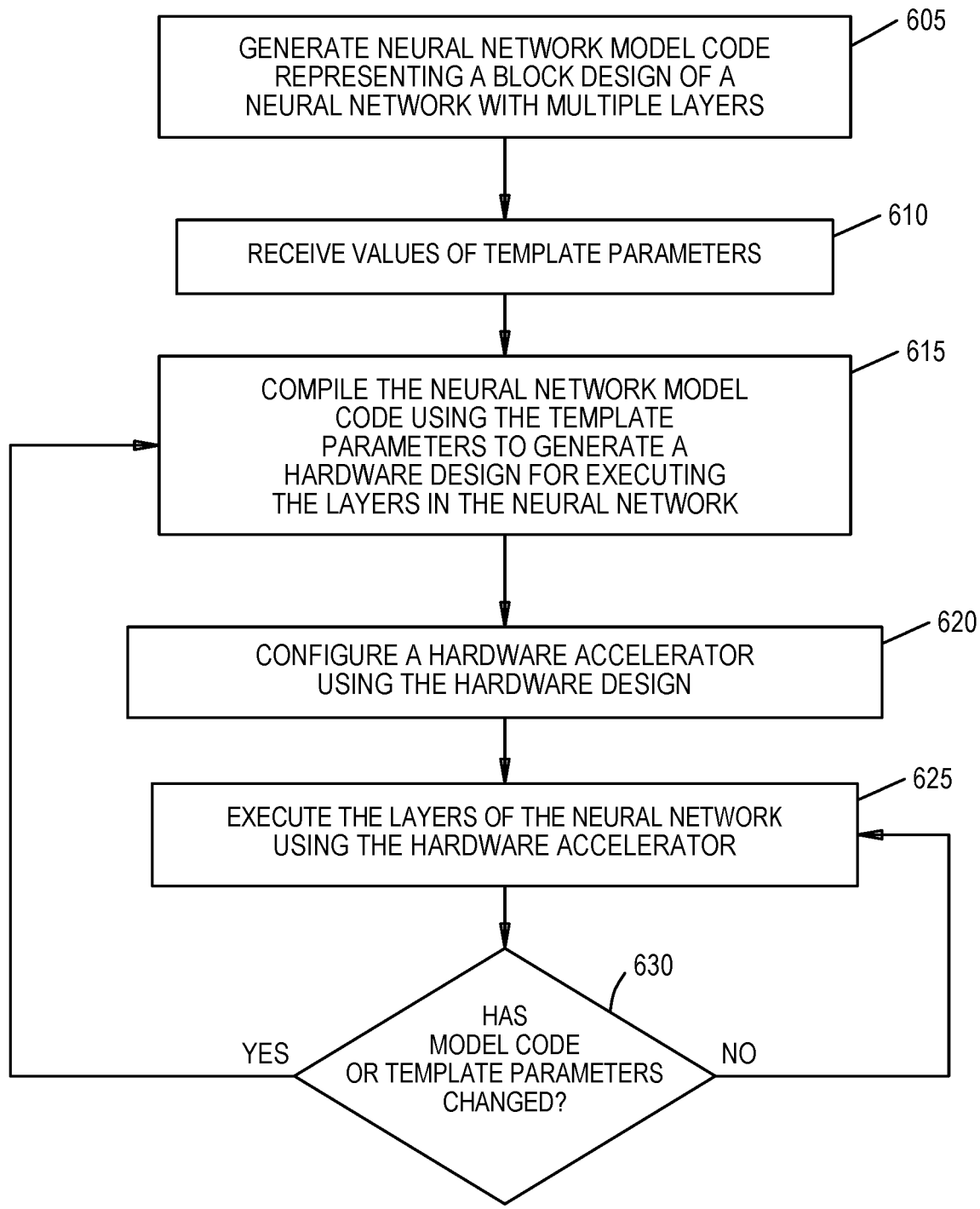
FIG. 6 is a flowchart for configuring a hardware accelerator using the neural network model code, according to an example.

FIG. 6 is a flowchart of a method 600 for configuring a hardware accelerator using the neural network model code, according to an example. At block 605, the neural network developer generates neural network model code representing a block design of a neural network with multiple layers. For example, the neural network model code may include the elements shown in FIG. 5 (e.g., the functional block code 505, template parameters 510, parallelization pragma 515, and bypass code 520) which define the architecture design 275—e.g., the functional blocks shown in FIG. 3. The block design can represent the general hardware elements used to perform the layers in the neural network which are expressed in a software model in the neural network model code.

At block 610, the compiler receives values of template parameters such as the stride of the im2col functions or different scaling values. Different values of the template parameters can result in different types, sizes, and configurations of the resulting hardware elements.

At block 615, the compiler compiles the neural network model code using the template parameters to generate a hardware design for executing the layers in the neural network. In one embodiment, an HLS compiler converts the high-level source code in the neural network model code into RTL code which is then used to configure programmable hardware such as an FPGA to implement the neural network accelerator that performs the block design of the neural network. Moreover, the RTL code can define data flow channels between the hardware elements which may include buffers. Although RTL is specifically mentioned, the compiler (or a synthesis tool) could generate any kind of hardware level design for executing the neural network accelerator in a hardware system such as a GPU or ASIC.

At block 620, an FPGA configures a hardware accelerator (e.g., a neural network accelerator) using the hardware design. That is, the FPGA can use the RTL provided by the compiler to configure its programmable logic to implement the neural network accelerator that performs the functions of the block design. In one embodiment, the functional blocks in the block design are scheduled such they can execute concurrently in the neural network accelerator.

At block 625, the neural network accelerator executes the layers of the neural network to process received data. In one example, the neural network accelerator is communicatively coupled to a neural network application executing on a host. The neural network application can transmit jobs or tasks to the neural network accelerator (e.g., a batch of images to be processed using the layers in the neural network). The neural network accelerator performs the jobs and then forwards the processed data back to the neural network application.

At block 630, the compiler determines whether the model code or template parameters have changed. As mentioned above, neural network models evolve at a rapid pace to increase accuracy, speed, or to solve domain specific problems which may result in the neural network developer changing the model code or the template parameters. For example, the neural network developer may add or remove layers from the neural network, or the developer may design a block model that can execute two different types of neural network. In any case, if the model code or the template parameters are updated, the method 600 proceeds to block 615 where the model code is again compiled to generate a new hardware design.

However, in other embodiments, the neural network developer may make other modifications that can be implemented without recompiling the model code. For example, the developer can change run-time parameters which alter the data flow through the architecture design but can be performed by the current hardware design. In that case, the method 600 can return to block 625 where the same accelerator can be used to execute the layers of the neural network.

In one embodiment, the method 600 is fully automated without interaction with a user. Put differently, the hardware design for the neural network accelerator can be generated without relying on a developer to provide the model code. In this embodiment, the neural network application executing on the host determines what type of processing needs to be done on received data like the size of the convolutions or the size of the im2col functions. The compiler can receive this information from the neural network application and generates the RTL that can perform these functions. Moreover, the neural network application can generate a bit stream for that network so that data is transferred between the host and the hardware platform containing the neural network accelerator.

Figure 7:
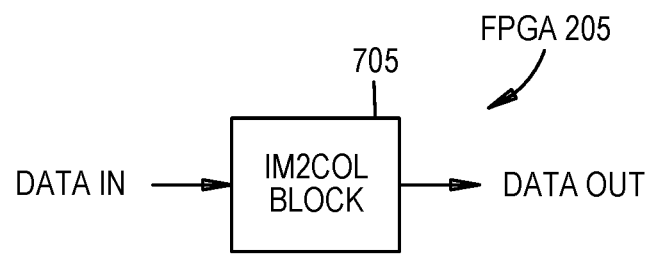
FIG. 7 illustrates hardware for performing a function in the hardware accelerator, according to an example.

FIG. 7 illustrates hardware in the FPGA 205 for performing a function in the hardware accelerator, according to an example. In this example, the FPGA 205 includes hardware elements forming an im2col block 705. In one embodiment, the im2col block 705 is reused when executing multiple layers of the neural network model. That is, the same hardware elements in the im2col block 705 used when executing a first layer in the neural network are also used when executing a second layer in the neural network. Reusing the same hardware elements may save space in the FPGA which can be used to perform other functions.

However, using the same hardware elements for multiple layers may save space in the FPGA but may slow down the overall performance of the neural network accelerator. For example, as mentioned above, different layers may use the im2col function differently (e.g., different strides or different amounts of data). Using the same im2col block 705 to execute these layers may slow down the neural network accelerator.

Figure 8:
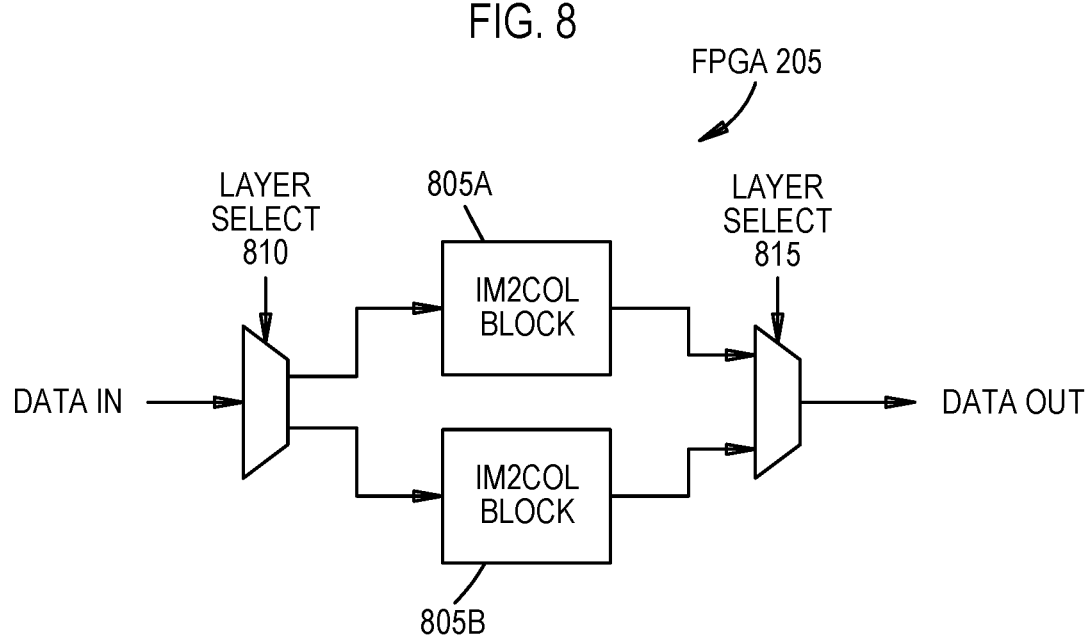
FIG. 8 illustrates optimized hardware for performing a function in the hardware accelerator, according to an example.

FIG. 8 illustrates optimized hardware for performing a function in the hardware accelerator, according to an example. Specifically, FIG. 8 illustrates an FPGA 205 that includes two im2col blocks 805 with conditional logic (e.g., muxes) used to select which of the im2col blocks 805 are used. For example, when executing a first layer, layer select signals 810 are used to forward the data to the im2col block 805A. The layer select signals 815 ensure the output of the im2col block 805A is then passed to the next hardware block in the accelerator. In contrast, when executing a second layer, the layer select signals 810 may route the data to the im2col block 805B for processing. Thus, in this embodiment, it may increase the performance of the FPGA 205 by using different hardware blocks that perform the same function (e.g., im2col) but are customized according to the differences in the layers. Moreover, in some instances, splitting the im2col function into two independent hardware elements may save space (e.g., use less hardware elements in the FPGA 205) relative to forming a single im2col block 705 as shown in FIG. 7.

The method 600 can help with optimizing the hardware in the FPGA 205 as shown in FIGS. 7 and 8. By changing the model code or the template parameters, the neural network design can optimize the hardware elements in the FPGA without having to know or understand RTL. Instead, the neural network developer can change the high-level code used to describe the architecture design (e.g., by adding two different parallel convolution units or max-pooling units and the run-time parameters needed to select between them). Thus, expressing the neural network in a high-level code can aid the neural network developer to try different configurations which may optimize the underlying hardware in the neural network accelerator without having to understand RTL since converting the model code into hardware code is handled by the compiler.

Figure 9:
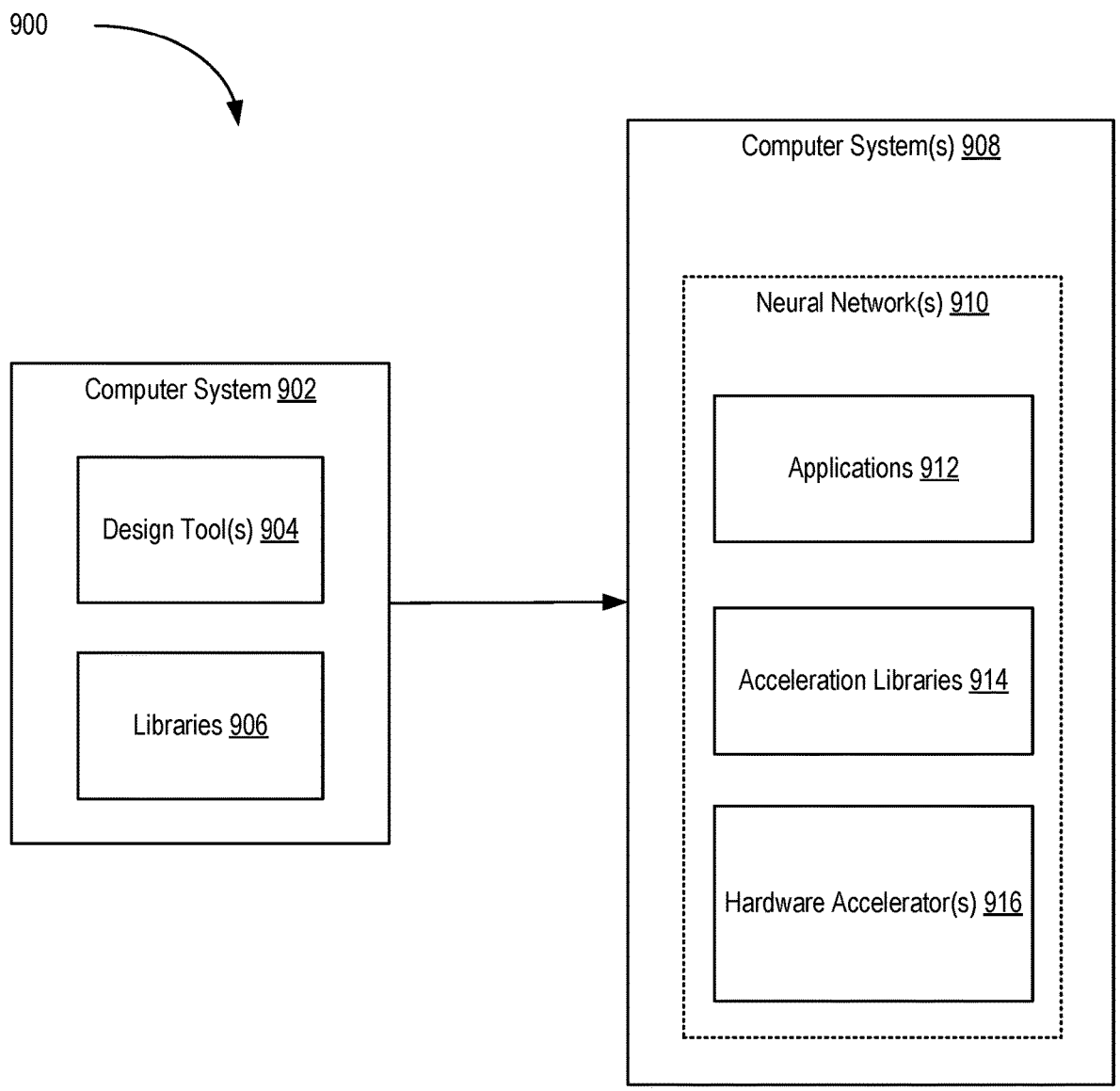
FIG. 9 is a block diagram depicting a system for implementing neural networks according to an example.

FIG. 9 is a block diagram depicting a system 900 for implementing neural networks according to an example. The system 900 includes a computer system 902 and one or more computer systems 908. The computer system 902 includes conventional computing components configured to execute software that provides one or more design tools 904. Each computer system 908 executes one or more neural networks 910 (as in any of the examples described above). The neural network(s) 910 are implemented using applications 912 (as in any of the examples described above), acceleration libraries 914 (as in any of the examples described above), and one or more hardware accelerators 916 (as in any of the examples described above).

In an example, the hardware accelerator(s) 916 include programmable ICs, such as FPGAs. The acceleration libraries 914 provide APIs to interface with the hardware accelerator(s) 916. The acceleration libraries 914 can also include libraries that provide neural network functions, including predefined and optimized implementations of neural network layers and other types of neural network structures. Thus, the neural network(s) 910 can include both hardware portions implemented in the hardware accelerator(s) 916, as well as software portions implemented in the acceleration libraries 914. The applications 912 invoke the APIs of the acceleration libraries 914 to program and control the hardware accelerator(s) 916 to implement the neural network(s) 910.

A designer interacts with the design tool(s) 904 to define the neural network(s) 910. The design tool(s) 904 can generate files for programming the hardware accelerator(s) 916 (e.g., configuration bitstreams for FPGAs), files that provide the acceleration libraries 914, and files that provide the applications 912. The designer can define the hardware portions of the neural network(s) 910 using a register transfer language (RTL) or using a programming language, such as C, C++, OpenCL, and the like, or a combination of RTL and programmable language(s). The user can define the software portions of the neural network(s) 910 using a programming language, such as C, C++, OpenCL, etc. The design tool(s) 904 compile the software-defined neural networks to generate files for programming the hardware accelerator(s) 916 and library files for the acceleration libraries 914. The designer can make use of libraries 906 that provide class libraries, template libraries, and the like to assist in developing the hardware and software portions of the neural network(s) 910.

A user can define the applications 912 using a programming language (e.g., C, C++, Python, etc.). The user can make use of neural network frameworks and libraries, such as Caffe, TensorFlow, MXNet, and the like.

Figure 10:
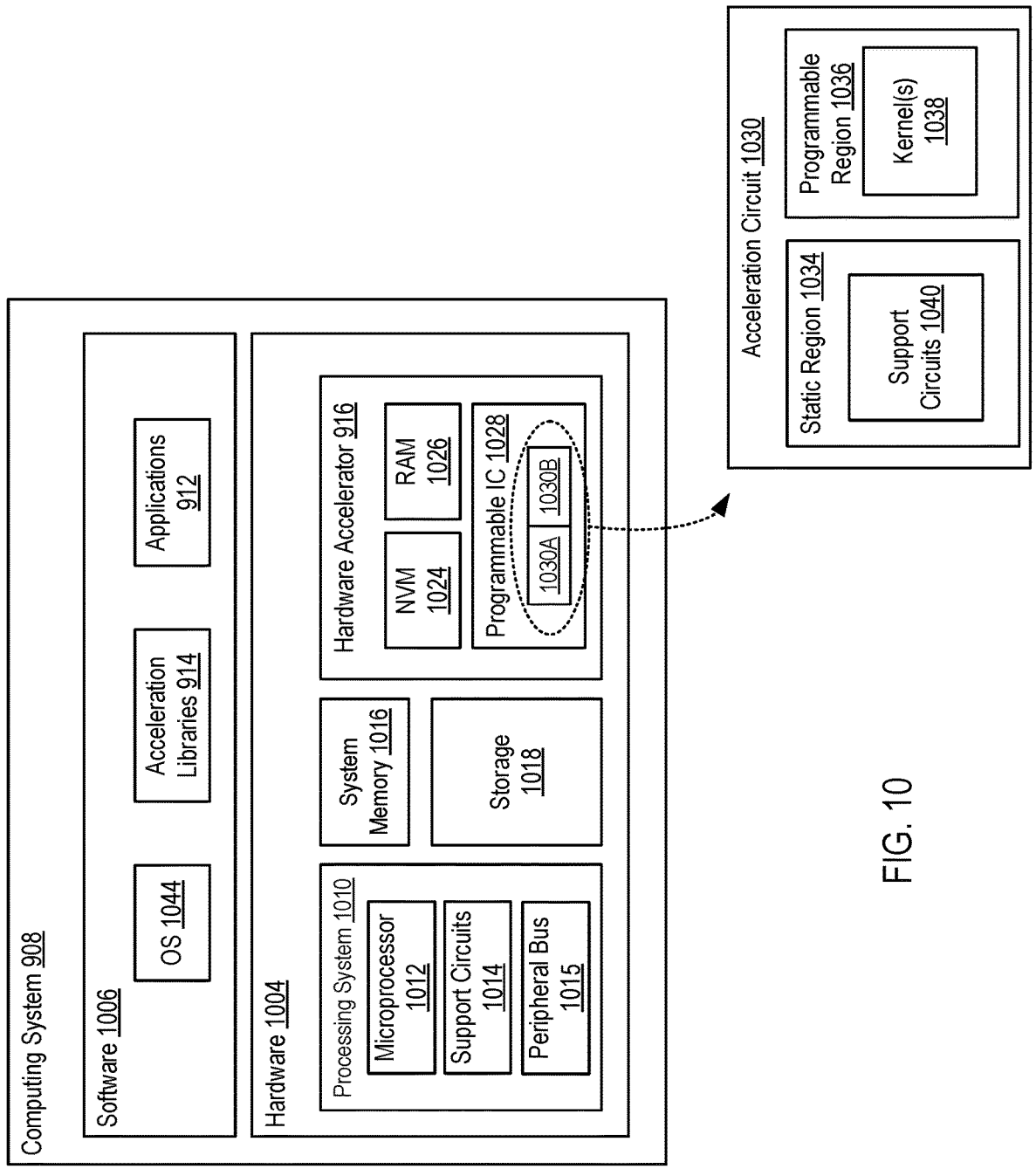
FIG. 10 is a block diagram depicting a computing system according to an example.

FIG. 10 is a block diagram depicting a computing system 908 according to an example. The computing system 908 includes hardware 1004 and software 1006 executing on the hardware 1004. The hardware 1004 includes a processing system 1010, system memory 1016, storage devices ("storage 1018"), and a hardware accelerator 916. The software 1006 includes an operating system (OS) 1044, the acceleration libraries 914, and the applications 912.

The processing system 1010 includes a microprocessor 1012, support circuits 1014, and a peripheral bus 1015. The microprocessor 1012 can be any type of general-purpose central processing unit (CPU), such as an x86-based processor, ARM®-based processor, or the like. The microprocessor 1012 can include one or more cores and associated circuitry (e.g., cache memories, memory management units (MMUs), interrupt controllers, etc.). The microprocessor 1012 is configured to execute program code that perform one or more operations described herein and which can be stored in the system memory 1016 and/or the storage 1018. The support circuits 1014 include various devices that cooperate with the microprocessor 1012 to manage data flow between the microprocessor 1012, the system memory 1016, the storage 1018, the hardware accelerator 916, or any other peripheral device. For example, the support circuits 1014 can include a chipset (e.g., a north bridge, south bridge, platform host controller, etc.), voltage regulators, firmware (e.g., a BIOS), and the like. The support circuits 1014 manage data flow between the microprocessor 1012 and the peripheral bus 1015, to which various peripherals, such as the hardware accelerator 916, are connected. In some examples, the microprocessor 1012 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 1010 is shown separate from the hardware accelerator 916. In other examples discussed further below, the processing system 1010 and the hardware accelerator 916 can be implemented on the same integrated circuit (IC) using a System-On-Chip (SoC).

The system memory 1016 is a device allowing information, such as executable instructions and data, to be stored and retrieved. The system memory 1016 can include, for example, one or more random access memory (RAM) modules, such as double-data rate (DDR) dynamic RAM (DRAM). The storage device 1018 includes local storage devices (e.g., one or more hard disks, flash memory modules, solid state disks, and optical disks) and/or a storage interface that enables the computing system 908 to communicate with one or more network data storage systems. The hardware 1004 can include various other conventional devices and peripherals of a computing system, such as graphics cards, universal serial bus (USB) interfaces, and the like.

The hardware accelerator 916 includes a programmable IC 1028, a non-volatile memory 1024, and RAM 1026. The programmable IC 1028 can be an FPGA or the like or an SoC having an FPGA or the like. The NVM 1024 can include any type of non-volatile memory, such as flash memory or the like. The RAM 1026 can include DDR DRAM or the like. The programmable IC 1028 is coupled to the NVM 1024 and the RAM 1026. The programmable IC 1028 is also coupled to the peripheral bus 1015 of the processing system 1010.

The OS 1044 can be any commodity operating system known in the art, such as such as Linux®, Microsoft Windows®, Mac OS®, or the like. The acceleration libraries 914 includes drivers and libraries that provide APIs for command and control of the hardware accelerator 916. The applications 912 include software executing on the microprocessor 1012 that invokes the APIs of the acceleration libraries 914 to implement neural network(s).

In operation, the programmable IC 1028 is configured with an acceleration circuit 1030. In one example, the acceleration circuit 1030 is the neural network accelerator 165 in FIG. 2 but the embodiments herein are not limited to such and may be other types of neural network accelerators or other types of hardware accelerators. The acceleration circuit 1030 generally includes a base platform 1030A and a kernel 1030B. For example, the acceleration circuit 1030 can be implemented using a static region 1034 and a programmable region 1036. The static region 1034 includes support circuits 1040 for providing an interface to the peripheral bus 1015, the NVM 1024, and the RAM 1026. The programmable region 1036 can include one or more kernel circuits ("kernel(s) 1038"). The base platform 1030A is implemented using the static region 1034, and the kernel 1030B is implemented using the programmable region 1036. In another example, the base platform 1030A can also be implemented using a portion of the programmable region 1036. Thus, in some examples, the programmable region 1036 also includes some interface circuits. In some examples, the acceleration circuit 1030 can include more than one programmable region 1036, each of which can be individually configured with kernel(s) 1038.

The static region 1034 is "static" in that the circuitry thereof remains constant across reconfigurations of the programmable region 1036. In an example, the support circuits 1040 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 1036 does not include any of the support circuits 1040. In other examples, some support circuits are implemented in the programmable region 1036. In such case, the programmable region 1036 can be referred to as an "expanded programmable region." In either case, in one example, some support circuits 1040 are always present in the static region 1034, such as the PCIe circuits and the DMA circuits.

Figure 11:
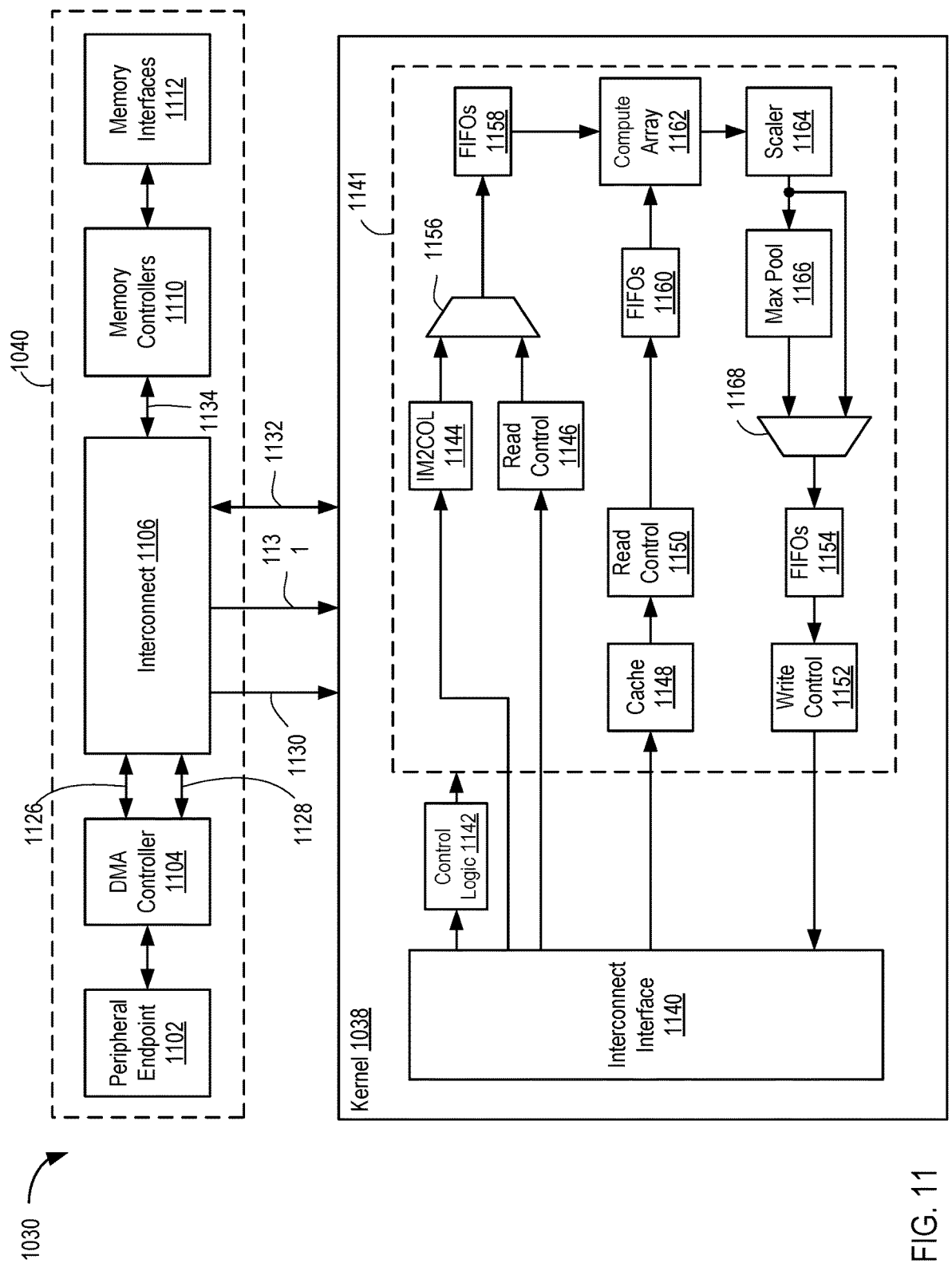
FIG. 11 is a block diagram depicting an acceleration circuit according to an example.

FIG. 11 is a block diagram depicting an acceleration circuit 1030 according to an example. The acceleration circuit 1030 includes the support circuits 1040 and a kernel 1038. In the example, the support circuits 1040 include a PCIe endpoint circuit ("PCIe endpoint 1102"), a PCIe DMA controller 1104, interconnect circuits ("interconnect 1106"), memory controllers 1110, and memory interfaces 1112. The support circuits 1040 can include other circuits, which are omitted for clarity (e.g., decoupler circuits, debug circuits, etc.). The PCIe endpoint 1102 provides a physical interface to the peripheral bus 1015. The PCIe DMA controller 1104 facilitates DMA operations to the RAM 1026 and the kernel 1038. The interconnect 1106 couples the PCIe DMA controller 1104 to the memory controllers 1110 and to the kernel 1038. The memory controllers 1110 are coupled to the memory interfaces 1112. The memory interfaces 1112 are coupled to the RAM 1026.

In operation, the acceleration libraries 914 can access the RAM 1026 directly through the PCIe DMA controller 1104. The acceleration libraries 1046 can also access the kernel 1038 through the PCIe DMA controller 1104. The kernel 1038 can access the RAM 1026 through the memory controllers 1110. Data can be exchanged between the software 1006 and the kernel 1038 using DMA operations between the system memory 1016 and the RAM 1026.

In the example, the kernel 1038 uses interfaces 1130, 1131, and 1132 to communicate with the interconnect 1106. In particular, these interfaces may include a first read interface 1130, a second read interface 1131, and a read/write interface 1132. For example, the read interface 1130 can be used as a control interface for controlling the kernel 1038. The read interface 1131 can be used to read from the RAM 1026 through a first one of the memory interfaces 1112. The read/write interface 1132 can be used to read and write from the RAM 1026 through a second one of the memory interfaces 1112.

The kernel 1038 includes an interconnect interface 1140, control logic 1142, and processing circuits 1141. The processing circuits 1141 include an IM2COL circuit ("IM2COL 1144"), a read control circuit ("read control 1146"), a multiplexer 1156, first-in-first-out circuits ("FIFOs 1158"), digital signal processor (DSP) array 1162, a scaler circuit ("scaler 1164" or ReLu), a max pool circuit ("max pool 1166"), a multiplexer 1168, FIFOs 1154, write control circuit ("write control 1152"), a cache 1148, a read control circuit ("read control 1150"), and FIFOs 1160. The interconnect interface 1140 is coupled to the interfaces 1130, 1131, and 1132, the control logic 1142, and the processing circuits 1141. The interconnect interface 1140 can include switches, clock converters, and the like to facilitate communication between the control logic 1142 and the interface 1130, as well as between the processing circuits 1141 and the interfaces 1131 and 1132.

In the example, the interconnect interface 1140 is coupled to inputs of the IM2COL circuit 1144, the read control circuit 1146, the cache 1148, and the write control circuit 1152. Outputs of the IM2COL circuit 1144 and the read control circuit 1146 are coupled to inputs of the multiplexer 1156. An output of the multiplexer 1156 is coupled to an input of the FIFOs 1158. An output of the FIFOs 1158 is coupled to a first input of the compute array 1162. An output of the cache 1148 is coupled to an input of the read control circuit 1150. An output of the read control circuit 1150 is coupled to an input of the FIFOs 1160. An output of the FIFOs 1160 is coupled to a second input of the compute array 1162. An output of the compute array 1162 is coupled to an input of the scaler 1164. An output of the scaler 1164 is coupled to an input of the max pool circuit 1166 and an input of the multiplexer 1168. An output of the max pool circuit 1166 is coupled to another input of the multiplexer 1168. An output of the multiplexer 1168 is coupled to an input of the FIFOs 1154. An output of the FIFOs 1154 is coupled to the write control circuit 1152.

In operation, the compute array 1162 performs matrix multiplication operations for implementing a neural network. The inputs of the compute array 1162 receive input activation matrices from the FIFOs 1158 and weight matrices from the FIFOs 1160. The input activation matrices can be read directly from the RAM 1026 using the read control circuit 1146. Alternatively, the input activations can be read from the RAM 1026 and processed by the IM2COL circuit 1144 for input to the compute array 1162. Embodiments of the IM2COL circuit 1144 are described below. Weight matrices can be read from the RAM 1026 by the read control circuit 1150 and cached in cache 1148. The scaler 1164 can scale the output of the compute array 1162. The max pool circuit 1166 can implement a max pooling function on the scaled output of the compute array 1162. In one example, the max pool circuit 966 is implemented using configurable logic blocks ("CLBs") or other configurable logic. Either the output of the max pool circuit 1166 or the scaler 1164 can be stored in the FIFOs 1154. The write control circuit 1152 writes data in the FIFOs to the RAM 1026. The control logic 1142 controls the various circuits in the processing circuits 1141, such as the IM2COL circuit 1144, the read control circuit 1146, the multiplexers 1156 and 1168, the read control circuit 1150, and the scaler 1164, the max pool circuit 1166, and the write control circuit 1152.

Figure 12:
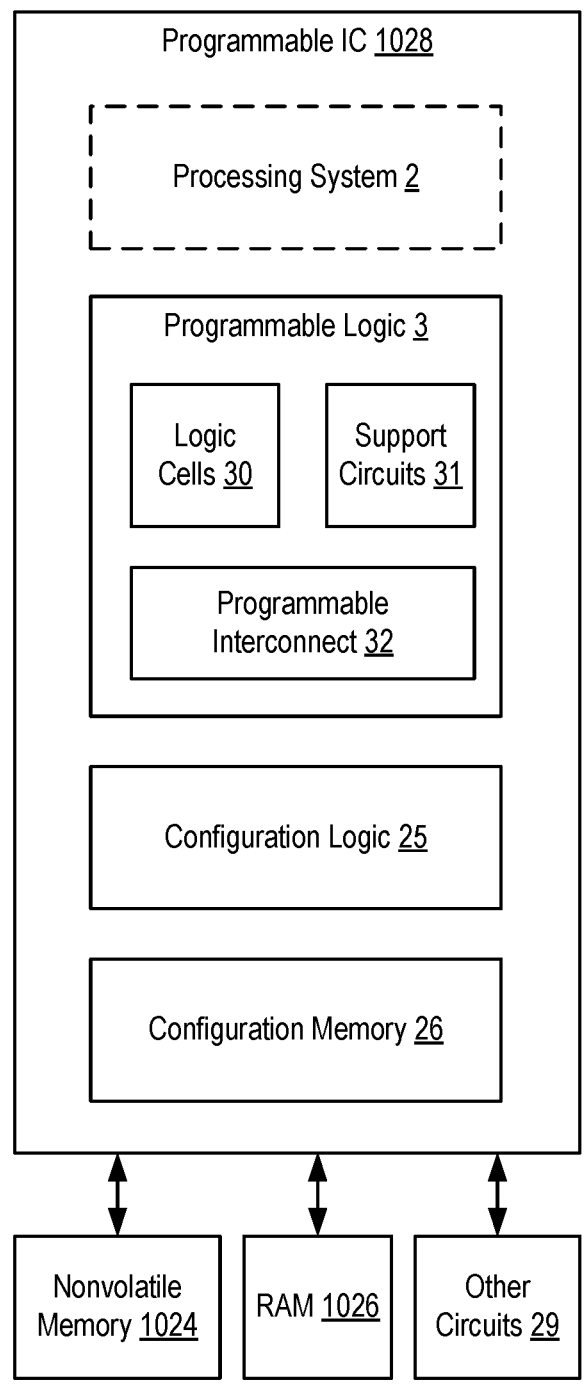
FIG. 12 is a block diagram depicting a programmable integrated circuit (IC) according to an example.

FIG. 12 is a block diagram depicting a programmable IC 1028 according to an example. The programmable IC 1028 includes programmable logic 3, configuration logic 25, and configuration memory 26. The programmable IC 1028 can be coupled to external circuits, such as the NVM 1024, the RAM 1026, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 1024 or any other source (e.g., the DRAM 28 or from the other circuits 29). In some examples, the programmable IC 1028 includes a processing system 2. The processing system 2 can include microprocessor(s), memory, support circuits, IO circuits, and the like. For example, the processing system 2 can include circuits similar to the processing system 1010. In some examples, the processing system 2 can be used in place of the processing system 1010. In such case, the entire computing system 808 can be implemented using the programmable IC 1028, where the software 1006 executes on the processing system 2.

Figure 13:
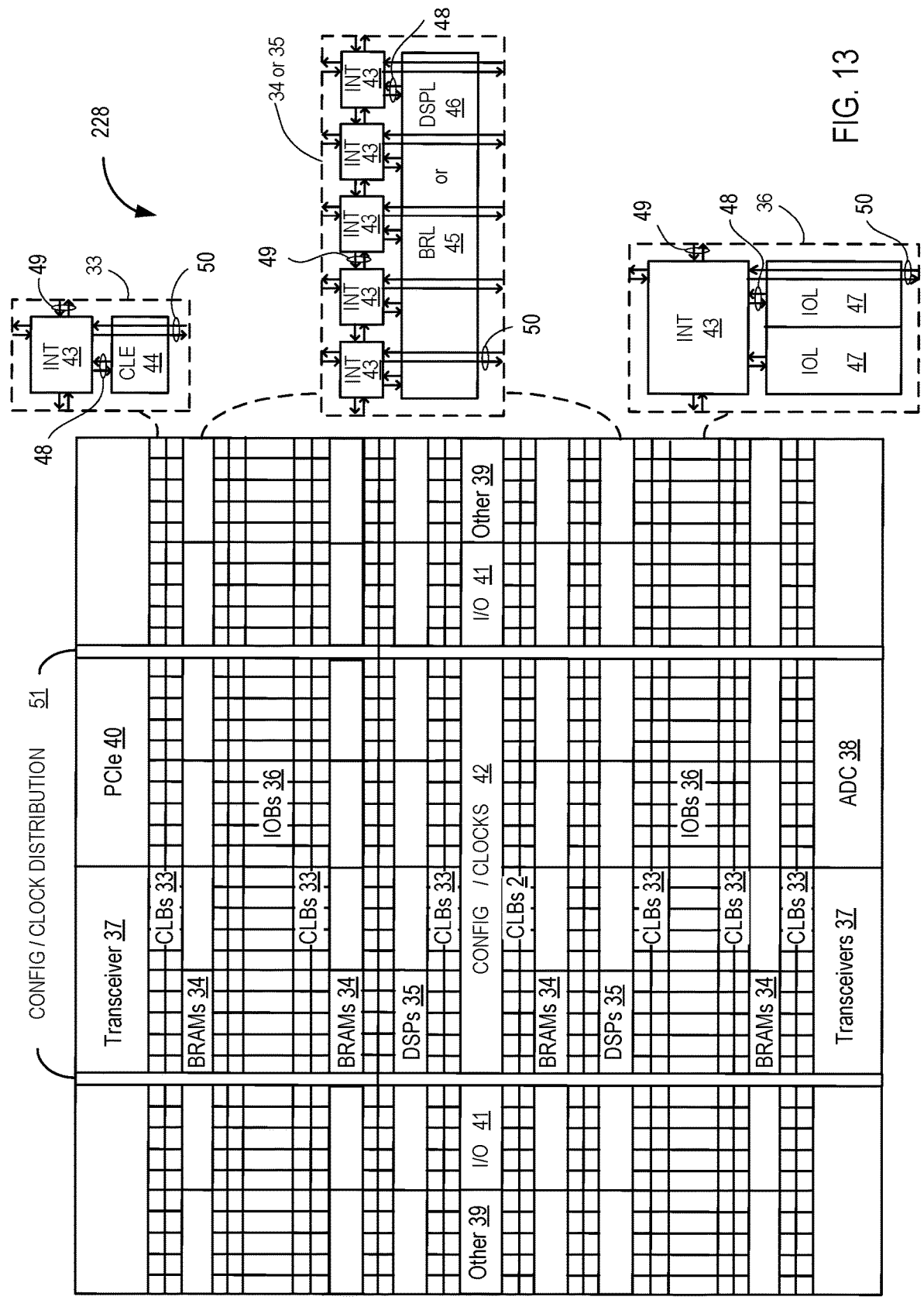
FIG. 13 illustrates a field programmable gate array (FPGA) implementation of a programmable IC according to an example.

FIG. 13 illustrates an FPGA implementation of the programmable IC 1028 that includes a large number of different programmable tiles including transceivers 37, CLBs 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 13. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 13) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 13 include additional logic blocks that disrupt the regular columnar structure making up a large part of the FPGA. The additional logic blocks can be programmable blocks and/or dedicated logic.

Note that FIG. 13 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 13 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for generating a neural network accelerator, the method comprising:
    receiving a neural network model comprising software code defining an architecture design, wherein the architecture design represents a plurality of functional blocks where conditional logic is disposed between each of the plurality of functional blocks for executing a plurality of layers in a neural network, wherein each of the plurality of functional blocks is software code in a different respective software class and wherein the conditional logic receives, as a first input, an output of a prior functional block and, as a second input, a bypass path that bypasses the prior functional block, and the conditional logic determines whether to forward either the first input or the second input to a subsequent functional block, wherein a first functional block is upstream of the first input, the second input, and the prior functional block, and the first functional block transmits data to (i) the second input of the conditional logic via the bypass path, and (ii) the prior functional block;
    receiving a value of a template parameter, wherein the template parameter controls an execution of at least one of the plurality of functional blocks, and wherein the value of the template parameter is separate from the software classes of the plurality of functional blocks; and
    compiling, using one or more computing processors, the software code in the neural network model into a hardware design that implements the neural network accelerator in a hardware system, wherein during compilation, the value of the template parameter is used as an argument in one of the respective software classes.

2. The method of claim 1, further comprising:
    configuring a field programmable gate array (FPGA) based on the hardware design, wherein the hardware design comprises register transfer level (RTL) code.

3. The method of claim 1, further comprising:
    receiving at least one of an updated neural network model and a new value of the template parameter, wherein the updated neural network model and the new value of the template parameter change an execution of at least one of the plurality of layers; and
    generating a new hardware design using at least one of the updated neural network model and the new value of the template parameter.

4. The method of claim 1, wherein the neural network model comprises a software defined parallelization pragma indicating a sequential execution order of the plurality of functional blocks.

5. The method of claim 1, wherein the conditional logic is contained within bypass code in the neural network model that comprises run-time parameters that establish different data flows through the plurality of functional blocks which correspond to the plurality of layers.

6. The method of claim 1, wherein the plurality of functional blocks in the architecture design includes at least one of a convolution unit, a pooling unit, and a matrix multiplier that transmits data to an activation unit.

7. A non-transitory computer-readable storage medium storing instructions, which when executed on one or more processing devices, perform an operation for generating a neural network accelerator, the operation comprising:
    receiving a neural network model comprising software code defining an architecture design, wherein the architecture design represents a plurality of functional blocks where conditional logic is disposed between each of the plurality of functional blocks for executing a plurality of layers in a neural network, wherein each of the plurality of functional blocks is software code in a different respective software class and wherein the conditional logic receives, as a first input, an output of a prior functional block and, as a second input, a bypass path that bypasses the prior functional block, and the conditional logic determines whether to forward either the first input or the second input to a subsequent functional block, wherein a first functional block is upstream of the first input, the second input, and the prior functional block, and the first functional block transmits data to (i) the second input of the conditional logic via the bypass path, and (ii) the prior functional block;
    receiving a value of a template parameter, wherein the template parameter controls an execution of at least one of the plurality of functional blocks, and wherein the value of the template parameter is separate from the software classes of the plurality of functional blocks; and compiling, using one or more computing processors, the software code in the neural network model into a hardware design that implements the neural network accelerator in a hardware system, wherein during compilation, the value of the template parameter is used as an argument in one of the respective software classes.

8. The computer-readable storage medium of claim 7, wherein the operation further comprises:
configuring a field programmable gate array (FPGA) based on the hardware design, wherein the hardware design comprises register transfer level (RTL) code.

9. The computer-readable storage medium of claim 7, wherein the operation further comprises:
receiving at least one of an updated neural network model and a new value of the template parameter, wherein the updated neural network model and the new value of the template parameter change an execution of at least one of the plurality of layers; and
generating a new hardware design using at least one of the updated neural network model and the new value of the template parameter.

10. The computer-readable storage medium of claim 7, wherein the neural network model comprises a software defined parallelization pragma indicating a sequential execution order of the plurality of functional blocks.

11. The computer-readable storage medium of claim 7, wherein the conditional logic is contained within bypass code in the neural network model that comprises run-time parameters that establish different data flows through the plurality of functional blocks which correspond to the plurality of layers.

12. The computer-readable storage medium of claim 7, wherein the plurality of functional blocks in the architecture design includes at least one of a convolution unit, a pooling unit, and a matrix multiplier that transmits data to an activation unit.

13. A computing system, comprising:
a processor; and
a memory comprising a compiler, wherein the compiler, when executed by the processor performs an operation comprising:
receiving a neural network model comprising software code defining an architecture design, wherein the architecture design represents a plurality of functional blocks where conditional logic is disposed between each of the plurality of functional blocks for executing a plurality of layers in a neural network, wherein each of the plurality of functional blocks is software code in a different respective software class and wherein the conditional logic receives, as a first input, an output of a prior functional block and, as a second input, a bypass path that bypasses the prior functional block, and the conditional logic determines whether to forward either the first input or the second input to a subsequent functional block, wherein a first functional block is upstream of the first input, the second input, and the prior functional block, and the first functional block transmits data to (i) the second input of the conditional logic via the bypass path, and (ii) the prior functional block;
receiving a value of a template parameter, wherein the template parameter controls an execution of at least one of the plurality of functional blocks, and wherein the value of the template parameter is separate from the software classes of the plurality of functional blocks; and
compiling, using one or more computing processors, the software code in the neural network model into a hardware design that implements a neural network accelerator in a hardware system, wherein during compilation, the value of the template parameter is used as an argument in one of the respective software classes.

14. The computing system of claim 13, wherein the operation further comprises:
transmitting the hardware design to a field programmable gate array (FPGA), wherein the hardware design comprises register transfer level (RTL) code.

15. The computing system of claim 13, wherein the operation further comprises:
receiving at least one of an updated neural network model and a new value of the template parameter, wherein the updated neural network model and the new value of the template parameter change an execution of at least one of the plurality of layers; and
generating a new hardware design using at least one of the updated neural network model and the new value of the template parameter.

16. The computing system of claim 13, wherein the neural network model comprises a software defined parallelization pragma indicating a sequential execution order of the plurality of functional blocks.

17. The computing system of claim 13, wherein the conditional logic is contained within bypass code in the neural network model that comprises run-time parameters that establish different data flows through the plurality of functional blocks which correspond to the plurality of layers.

* * * * *